United States Patent
McCaffrey et al.

[11] 3,816,336
[45] June 11, 1974

[54] NOVEL ELECTRO-OPTIC DEVICES

[75] Inventors: Michael Thomas McCaffrey, Cranbury; Joseph Anthony Castellano, North Brunswick, both of N.J.

[73] Assignee: RCA Corporation, New York, N.Y.

[22] Filed: June 15, 1972

[21] Appl. No.: 263,228

[52] U.S. Cl. ........ 252/408, 350/160 LC, 23/230 LC
[51] Int. Cl. .............................................. C09k 3/08
[58] Field of Search ........... 252/408, 501, 500, 300; 350/160 LC; 23/230 LC

[56] References Cited
UNITED STATES PATENTS
3,650,603  3/1972  Heilmeier et al. .................. 252/408
3,690,745  9/1972  Jones ................................. 252/408

Primary Examiner—Leon D. Rosdol
Assistant Examiner—Jacqueline Ware
Attorney, Agent, or Firm—Glenn H. Bruestle; Birgit E. Morris

[57] ABSTRACT

Electro-optic devices comprising a thin layer of a liquid crystal composition containing a compound of the formula

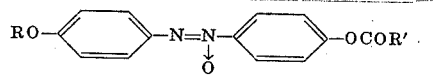

wherein R and R' are alkyl groups of 1-7 carbon atoms between conductive support plates, offer a wide range of use temperatures.

6 Claims, 2 Drawing Figures

PATENTED JUN 11 1974　3,816,336

NOVEL ELECTRO-OPTIC DEVICES

This invention relates to novel liquid crystal compositions and to electro-optic devices containing these compositions which offer a wide range of use temperatures.

BACKGROUND OF THE INVENTION

The term liquid crystal has been applied to various compositions which exhibit an intermediate, or mesomorphic, state between the solid anisotropic crystalline state and the isotropic liquid state. These compositions are fluid but exhibit optical properties similar to crystalline solids.

There are three mesomorphic states; the smectic mesophase, the nematic mesophase and the cholesteric mesophase. Nematic liquid crystals are transparent liquids which, when placed in an electric field, become disoriented and scatter light, thereby becoming opaque. Liquid crystals which exhibit the smectic mesophase are cloudy, viscous liquids which cling to a capillary tube and do not form a meniscus. These highly oriented liquids when heated further form a smectic-nematic phase wherein the liquid crystal becomes less viscous and forms a meniscus in a capillary tube.

Several types of compounds are known to exhibit nematic liquid crystal behavior. For example, U.S. Pat. No. 3,540,796 describes compounds of the formula

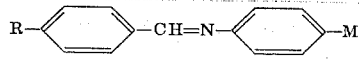

wherein R and M are alkoxy or acyloxy radicals. These compounds have been found to be less than completely satisfactory for applications such as animated advertisement displays, wrist watches and calculating machines which require a wide use temperature range and long life. The prior art liquid crystals undergo failure due to irreversible chemical changes, probably in the central azomethine linkage, under prolonged DC excitation, resulting in premature failure of the electro-optic devices incorporating them.

SUMMARY OF THE INVENTION

We have found that certain novel azoxybenzene compounds are liquid crystals having a wide use temperature range and long life. Improved electro-optic devices of the invention comprise a layer of one or more compounds as hereinafter described and means for applying an electric field thereto.

DETAILED DESCRIPTION OF THE INVENTION

Figure 1:
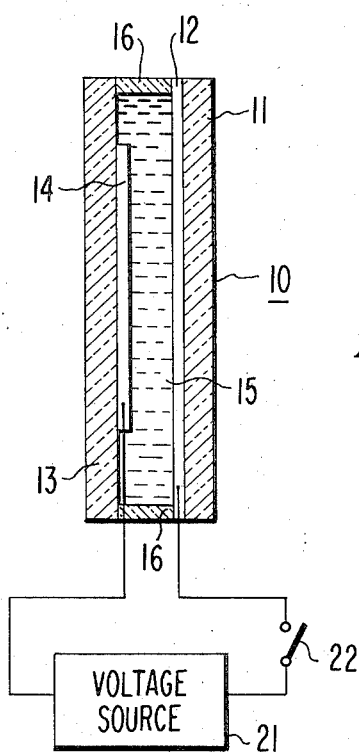
FIGS. 1 and 2 are side and front views respectively of a simple electro-optic light valve embodying the invention.
Figure 2:
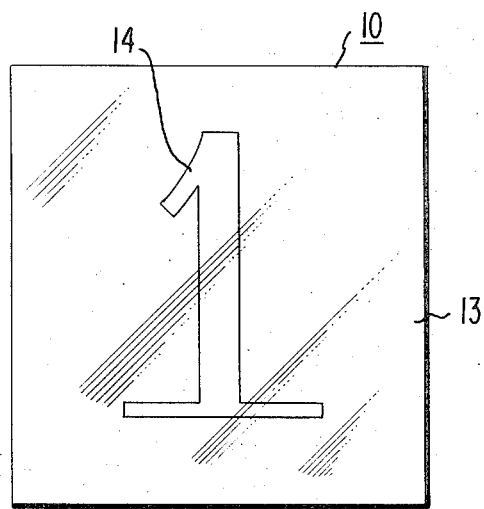

The novel liquid crystal compounds of the invention comprise one or more azoxybenzene compounds of the formula (1)
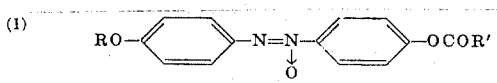

wherein R and R' are alkyl groups having from 1-7 carbon atoms. R and R' can be the same or different and can be branched or straight chain alkyl groups. These compounds can be employed in electro-optic devices alone or mixtures of the present azoxybenzene compounds can be employed. In addition, one or more of the compounds of the invention can be admixed with other azoxybenzene compounds.

The compounds of the invention can be prepared by reacting a p-alkoxy-substituted aromatic primary amine with nitrous acid in the cold and adding a phenol to form the corresponding p'-hydroxyaryl azo compound. The latter can be reacted with an anhydride in pyridine to esterify the hydroxy group and the resultant product reacted with formic acid and hydrogen peroxide to form the corresponding azoxybenzene compound. These reactions can be summarized by the equations presented below:

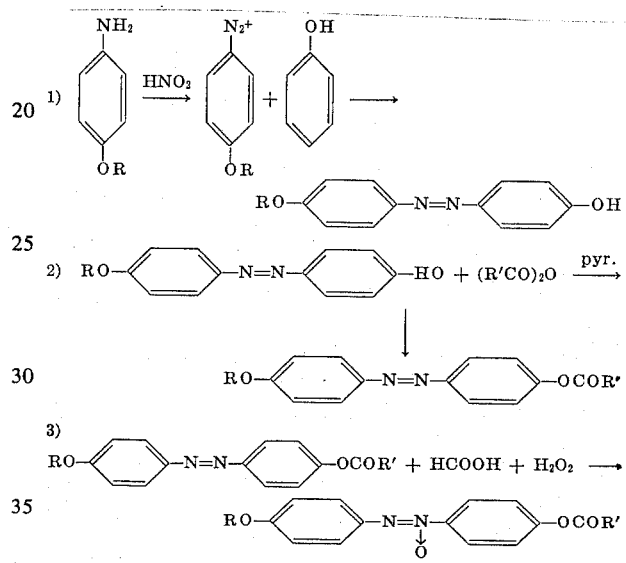

The embodiment of an electro-optic device shown in the figures is a simple numerical indicator 10. The indicator comprises a back support plate 11 having a continuous reflecting conductive coating 12 on one surface thereof, a front support plate 13 having a transparent conductive coating 14 on one surface thereof and a liquid crystal composition of the invention 15 between said conductive coatings or electrodes 12 and 14 respectively. The transparent conductive electrode 14 on the front support plate 13 is made in the shape of the pattern desired to be shown by the device, for example, in the shape of the numeral 1. The reflecting electrode 12 may be made, for example, of vacuum evaporated aluminum. The transparent conductive electrode 14 may be a tin oxide film. The thickness of the liquid crystal layer 15 is preferably between about ¼ to ½ mil. The edges of the device are sealed with a thermoplastic sealing agent 16.

In operation of the device, the transparent electrode and the reflective electrode are connected to a voltage source 21. This voltage source may be either AC or DC current. For longest device life, AC operation is preferred. When ambient light is incident upon the device in its off state, no pattern is visible to an observer looking at the device from the front side thereof. When a voltage is applied by means of voltage source 21 across the liquid crystal composition 15 and through a switch 22, it causes the liquid crystal composition 15 to scatter light in the region between the electrodes 12 and 14 when switch 22 is closed. This causes the observer to see a bright pattern which is the same as the pattern of the transparent electrode 14.

The above illustrated device is just one of many embodiments of the invention. For example, both electrodes may be transparent. In such case, the device will generally operate in a transmissive mode, i.e., with a light source on the side of the device opposite that of the observer. It is also possible to include row and column conductors for exciting selected areas of the liquid crystal device.

In operation the electro-optic device is heated to a temperature so as to bring the liquid crystal composition within the device to its mesomorphic or liquid crystalline state. It is therefore preferable to use liquid crystal compositions exhibiting mesomorphic behavior as close to room temperature as possible. The use of mixtures of the azoxybenzene compounds as hereinabove described serves to increase the operating use temperature range of the electro-optic device.

The invention will be further illustrated by the following examples, but it is to be understood that the invention is not meant to be limited to the details described therein. In the examples, parts are by weight unless otherwise noted.

EXAMPLE 1

To a solution of 15.1 parts of p-propoxyaniline in dilute hydrochloric acid (equal volumes of water and concentrated hydrochloric acid) cooled to 0°C was added a solution of 8 parts of sodium nitrate in 40 parts of water while maintaining the temperature below 10°C. The resultant mixture was added to a cold solution of 10.4 parts of phenol in 90 parts of 10 percent aqueous sodium hydroxide. Brown crystals of the p-propoxyphenylazo-p'-phenol product precipitated, were collected by filtration, washed with water and dried under vacuum.

2.6 Parts of the azo product were mixed with 1.0 part of acetic anhydride in 50 parts by volume of pyridine and stirred for two hours at ambient temperatures. The resultant mixture was poured into 500 parts of ice water when orange crystals of p-propoxy-p'-acetoxyazobenzene precipitated. The precipitate was filtered, dried and recrystallized from isopropanol.

A solution containing 1.5 parts of p-propoxy-p'-acetoxyazobenzene in 10 parts by volume of methylene chloride was added dropwise to a solution of 10 parts of formic acid (97 percent) and 8 parts by volume of hydrogen peroxide (30 percent stabilized) in 40 parts by volume of methylene chloride. The resultant mixture was refluxed for 2 hours, the solvent layer collected, washed with water, dried over sodium sulfate and the solvent stripped.

The desired product, p-propoxy-p'-acetoxyazoxybenzene having the formula

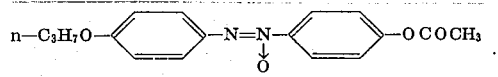

was recrystallized from isopropanol. This compound had a crystal-nematic transition temperature of 86°C. and a nematic-isotropic liquid transition temperature of 123°C.

EXAMPLES 2–41

Other compounds of the invention were prepared in similar manner, except substituting the appropriate starting materials.

Examples of the compounds of the invention are given in Table I below, together with their crystal-nematic (C–N) transition temperatures and their nematic-isotropic liquid (N–L) transition temperatures. These compounds are mesomorphic or liquid crystalline in the temperature range between these two transition temperatures.

In Table I, R and R' have reference to the formula 1 hereinabove, and are straight chain alkyl groups.

TABLE 1

| Example | | | C–N,°C. | N–L,°C. |
|---|---|---|---|---|
| 2 | R=CH₃, | R'= CH₃ | 125 | 133 |
| 3 | do. | C₂H₅ | 82 | 127 |
| 4 | do. | C₃H₇ | 78 | 130 |
| 5 | do. | C₄H₉ | 87 | 116 |
| 6 | R=CH₃, | R'= C₅H₁₁ | 73 | 120 |
| 7 | do. | C₆H₁₃ | 77 | 110 |
| 8 | do. | C₇H₁₅ | 72 | 114 |
| 9 | R=C₂H₅, | R'= CH₃ | 98 | 151 |
| 10 | do. | C₂H₅ | 99 | 152 |
| 11 | do. | C₃H₇ | 84 | 151 |
| 12 | do. | C₄H₉ | 69 | 136 |
| 13 | do. | C₅H₁₁ | 81 | 138 |
| 14 | do. | C₆H₁₃ | 66 | 129 |
| 15 | do. | C₇H₁₅ | 77 | 130 |
| 16 | R=C₃H₇, | R'= C₂H₅ | 89 | 118 |
| 17 | do. | C₃H₇ | 77 | 127 |
| 18 | do. | C₄H₉ | 70 | 117 |
| 19 | do. | C₅H₁₁ | 69 | 119 |
| 20 | do. | C₆H₁₃ | 67 | 111 |
| 21 | do. | C₇H₁₅ | 68 | 115 |
| 22 | R=C₄H₉, | R'= CH₃ | 81 | 130 |
| 23 | do. | C₂H₅ | 82 | 134 |
| 24 | do. | C₃H₇ | 79 | 135 |
| 25 | do. | C₄H₉ | 66 | 118 |
| 26 | do. | C₅H₁₁ | 64 | 125 |
| 27 | do. | C₆H₁₃ | 64 | 120 |
| 28 | do. | C₇H₁₅ | 63 | 122 |
| 29 | R=C₅H₁₁, | R'= CH₃ | 83 | 118 |
| 30 | do. | C₂H₅ | 71 | 124 |
| 31 | do. | C₃H₇ | 66 | 126 |
| 32 | do. | C₄H₉ | 58 | 117 |
| 33 | do. | C₅H₁₁ | 59 | 119 |
| 34 | R=C₆H₁₃, | R'= CH₃ | 82 | 123 |
| 35 | do. | C₂H₅ | 68 | 128 |
| 36 | do. | C₃H₇ | 66 | 128 |
| 37 | do. | C₄H₉ | 68 | 119 |
| 38 | do. | C₅H₁₁ | 66 | 122 |
| 39 | R=C₇H₁₅, | R'= CH₃ | 77 | 117 |
| 40 | do. | C₂H₅ | 75 | 119 |
| 41 | do. | C₃H₇ | 61 | 123 |

EXAMPLES 42–49

Certain higher molecular weight compounds of the invention exhibit a crystal-smectic (C–S) transition temperature and a smectic-nematic (S–N) transition temperature as well as the neamtic-isotropic liquid (N–L) transition temperature. Such compounds are given in Table II below wherein R and R' have the meanings given in Examples 2–41.

TABLE II

| Example | | | C–S, °C | S–N, °C | N–L, °C |
|---|---|---|---|---|---|
| 42 | R=C₅H₁₁ | R'= C₆H₁₃ | 54 | 58 | 115 |
| 43 | do. | C₇H₁₅ | 58 | 67 | 117 |
| 44 | R=C₆H₁₃ | C₆H₁₃ | 60 | 72 | 119 |
| 45 | do. | C₇H₁₅ | 62 | 80 | 121 |
| 46 | R=C₇H₁₅ | R'= C₄H₉ | 69 | 71 | 117 |
| 47 | do. | C₅H₁₁ | 68 | 78 | 120 |
| 48 | do. | C₆H₁₃ | 61 | 85 | 117 |
| 49 | do. | C₇H₁₅ | 63 | 90 | 118 |

EXAMPLE 50

The procedure of Example 1 was followed to prepare p-methoxy-p'-(3-methylpentanoyloxy)azoxybenzene of the formula

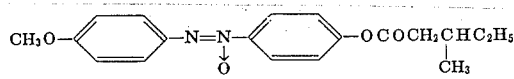

This compound had a C–N transition of 50°C. and an N–L transition of 90°C.

Mixtures of two or more compounds of the invention or mixtures containing a compound of the invention with other azoxybenzene compounds, such as azoxybenzenes of the formula

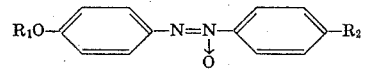

or

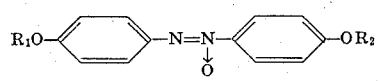

wherein $R_1$ and $R_2$ are alkyl groups, may extend the use temperature range of electro-optic devices incorporating them. Although the relative amounts of the compounds in these mixtures are not critical, equimolar amounts are preferred. Representative mixtures are illustrated by the following examples.

EXAMPLE 51

An equimolar mixture of p-methoxy-p'-(3-methylpentanoyloxy)azoxybenzene and p-ethoxy-p'-butylazoxybenzene had a C–N transition of 28°C. and N–L transition of 92°C.

EXAMPLE 52

An equimolar mixture of p-methoxy-p'-(3-methylpentanoyloxy)azoxybenzene, p-methoxy-p'-butylazoxybenzene and p-ethoxy-p'-butylazoxybenzene had a C–N transition of 3°C. and an N–L transition of 85°C.

EXAMPLE 53

An equimolar mixture of p-ethoxy-p'-butanoyloxyazoxybenzene, p-methoxy-p'-heptanoyloxyazoxybenzene and p-methoxy-p'-butanoyloxyazoxybenzene had a C–N transition of 43°C. and an N–L transition of 129°C.

We claim:

1. In an electro-optic device consisting essentially of a liquid crystal layer between electric conductors, the improvement which comprises employing as the liquid crystal one or more azoxybenzene compounds of the formula

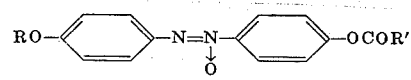

wherein R and R' independently are alkyl groups having 1–7 carbon atoms.

2. A device according to claim 1 wherein the liquid crystal layer is between about ¼ and about ½ mil in thickness.

3. A device according to claim 1 wherein the liquid crystal is a mixture of the azoxybenzene compounds.

4. A liquid crystal composition consisting essentially of a mixture of azoxybenzene compounds selected from the group consisting of compounds having the formula a)

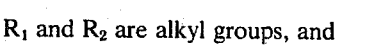

wherein R and R' independently are alkyl groups having 1–7 carbon atoms, b)

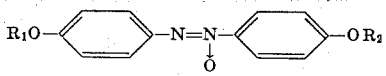

wherein $R_1$ and $R_2$ are alkyl groups, and c)

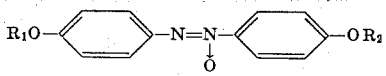

wherein $R_1$ and $R_2$ are alkyl groups, and wherein at least one of said azoxybenzene compounds is selected from those of formula (a).

5. A composition according to claim 4 wherein the mixture contains p-methoxy-p'-(3-methylpentanoyloxy)azoxybenzene, p-ethoxy-p'-butylazoxybenzene and p-methoxy-p'-butylazoxy benzene.

6. A composition according to claim 5 wherein the azoxybenzene compounds are present in equimolar proportions.

* * * * *